US010951236B2

(12) United States Patent
Chen et al.

(10) Patent No.: US 10,951,236 B2
(45) Date of Patent: Mar. 16, 2021

(54) HIERARCHICAL DATA INTEGRITY VERIFICATION OF ERASURE CODED DATA IN A DISTRIBUTED COMPUTING SYSTEM

(71) Applicant: MICROSOFT TECHNOLOGY LICENSING, LLC, Redmond, WA (US)

(72) Inventors: Daniel Chen, Seattle, WA (US); Cheng Huang, Bellevue, WA (US); Jonathan J. Bruso, Sammamish, WA (US); Marat Marsovich Galeev, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 37 days.

(21) Appl. No.: 16/175,696

(22) Filed: Oct. 30, 2018

(65) Prior Publication Data

US 2020/0136652 A1    Apr. 30, 2020

(51) Int. Cl.
*G11C 29/00* (2006.01)
*H03M 13/15* (2006.01)
(Continued)

(52) U.S. Cl.
CPC ....... *H03M 13/154* (2013.01); *G06F 11/1004* (2013.01); *G06F 11/1076* (2013.01); *H04L 9/3239* (2013.01)

(58) Field of Classification Search
CPC .... H03M 13/154; H03M 13/07; H03M 13/09; H03M 13/373; H03M 13/1525;
(Continued)

(56) References Cited

U.S. PATENT DOCUMENTS 8,307,271 B1   11/2012  Liu et al.
8,782,492 B2 *  7/2014  Resch ................ H04L 63/0823
                                                          714/764
(Continued)

OTHER PUBLICATIONS

"International Search Report and Written Opinion Issued in PCT Application No. PCT/US2019/057507", dated Feb. 7, 2020, 14 Pages.

*Primary Examiner* — Albert Decady
*Assistant Examiner* — Enamul M Kabir
(74) *Attorney, Agent, or Firm* — Shook, Hardy & Bacon L.L.P.

(57) ABSTRACT

Various methods, computer storage media, and systems for implementing hierarchical data integrity verification, in distributed computing systems, are provided. A data manager operates to perform hierarchical data integrity verification operations on message-digests that are associated based on a linear property of a non-cryptographic function, such that a data integrity of source data is verifiable based on the message-digests combined based on an exclusive-or (XOR) operator. The data manager accesses data fragments that are erasure coded fragments and a parity fragment generated from the data fragments, which correspond to source data. The data manager generates and stores the data-fragment message-digests, data-parity message-digests, and parity-fragment message-digests in corresponding data fragment zones and parity fragment zones. The data manager executes two different types of hierarchical data integrity verification operations, to verify the data integrity of the source data, the operations include: local data integrity verification operations, and global data integrity verification operations.

20 Claims, 14 Drawing Sheets

(51) Int. Cl.
*G06F 11/10* (2006.01)
*H04L 9/32* (2006.01)

(58) Field of Classification Search
CPC ............ H03M 13/2909; G06F 11/1076; G06F 11/1004; G06F 21/64; H04L 9/3239; H04L 1/0041; H04L 1/0045; H04L 1/0057; H04L 67/1097
USPC ........................................................ 714/764
See application file for complete search history.

(56) References Cited

U.S. PATENT DOCUMENTS

| | | | |
|---|---|---|---|
| 8,910,031 B1* | 12/2014 | Liu | H03M 13/09 |
| | | | 711/111 |
| 9,959,167 B1 | 5/2018 | Donlan et al. | |
| 2003/0140288 A1* | 7/2003 | Loaiza | G06F 11/0727 |
| | | | 714/718 |
| 2013/0275381 A1 | 10/2013 | De schrijvr et al. | |
| 2014/0380126 A1* | 12/2014 | Yekhanin | G06F 11/10 |
| | | | 714/766 |
| 2016/0239384 A1* | 8/2016 | Slik | G06F 16/22 |
| 2017/0060683 A1* | 3/2017 | Luby | G06F 3/0644 |
| 2018/0060242 A1* | 3/2018 | Raghunath | H03M 13/3761 |
| 2018/0121673 A1* | 5/2018 | Goldfarb | G06F 21/6218 |
| 2018/0152516 A1* | 5/2018 | Bestler | H04L 12/18 |
| 2020/0134202 A1* | 4/2020 | Sapuntzakis | G06F 21/6218 |

\* cited by examiner

HIERARCHICAL DATA INTEGRITY VERIFICATION OF ERASURE CODED DATA IN A DISTRIBUTED COMPUTING SYSTEM

BACKGROUND

Users often rely on applications and services to perform computing tasks. Distributed computing systems (e.g., cloud computing platforms) are computing architectures that support network access to a shared pool of configurable computing and storage resources. A distributed computing system can support building, deploying, and managing applications and services. Users and enterprises are moving away from traditional computing infrastructures to run their applications and services on distributed computing systems. As such, distributed computing system providers are faced with the challenge of supporting the increasing number of users and enterprises sharing the same distributed computing system resources.

By way of example, distributed computing systems may use fault-tolerant storage techniques for proficient and dependable storage of data. In particular, erasure coding techniques may be employed to reduce storage overhead. Erasure coding may be implemented across storage nodes (e.g., disks, servers and racks). Erasure coding can provide efficient recovery of missing data based on local protection groups that define local dependencies between code data fragments and parity fragments. Local protection groups can be implemented with varying complexities and structures to support different fault tolerance properties of erasure coded data when recovering missing data.

With the ever-increasing use of distributed computing systems, improvements in computing operations for managing distributed data and, in particular, distributed data integrity verification in distributed computing systems, can provide more provide more efficient processing of distributed data and efficiency in storage and retrieval of distributed data.

SUMMARY

Embodiments described herein are directed to methods, systems, and computer storage media, for hierarchical data integrity verification of erasure coded data in distributed computing systems. By way of background, user data may be stored and replicated to provide high availability and durability of the data within the distributed computing system. Data (e.g., binary large object—blob) may specifically be stored in a distributed manner as erasure coded fragments (e.g., data fragments and parity fragments "fragments") using an erasure coding scheme. For example, suppose the distributed computing system implements a simple 3-1 exclusive-or or exclusive disjunction (i.e., XOR) erasure coding scheme, where data, such as a block of a blob, is divided into 3 equal data fragments, and the data fragments are XORed to create a parity fragment. The fragments can be stored in different zones (e.g., datacenters) as part of high availability and durability. It is then important to verify the data integrity of the fragments because, as needed, the fragments may be reassembled to reconstruct the original data (e.g., a source blob). If the fragments are corrupted, for example, during the transfer for storage in different zones, the capacity to reconstruct the original data from the fragments may be lost.

Conventional methods of data integrity verification fall short of providing a solution for efficiently performing data integrity verification. In one example implementation, there is significant cost associated with transferring the transferred data blocks back from their storage zones to verify the integrity with the original data. In another implementation, cryptographic hash functions do not adequately support erasure coded fragments because unlike non-erasure coded data that are stored as duplicates, each erasure coded fragments is different. As such, improvements to the computing operations, functionality, and the technological process of providing data integrity verification in distributed computing operations can be defined to address the above-described and other limitation in conventional systems.

In operation, a data manager operates to perform hierarchical data integrity verification operations on message-digests that are associated based on a linear property of a non-cryptographic function. In particular, based on the linear property of the non-cryptographic hash function, data integrity of source data is verifiable based on the message-digests (e.g., data-fragment message-digests, data-parity message-digests, or parity-fragment message-digests) and a linear operation.

The data manager accesses data fragments that are erasure coded fragments and accesses a parity fragment generated from the data fragments. The data fragments and the parity fragment correspond to source data. Using the non-cryptographic hash function, the data manager generates data-fragment message-digests, data-parity message-digests, and parity-fragment message-digests. The data manager stores the data fragments and corresponding data-fragment message-digests and data-parity message-digests at two or more data fragment zones and also stores the parity fragment and a corresponding parity-fragment message-digest at a parity fragment zone.

The data manager executes two different types of hierarchical data integrity verification operations: a local data integrity verification operation, and a global data integrity verification operation.

There are two types of local data integrity verification operations:

(1) comparing a local data-fragment message-digest of a data fragment to a source data-fragment message-digest of the data fragment in a data fragment zone (i.e., $CRC_{LOCAL\_DF}$ (DC1) is compared to $CRC_{SOURCE\_DF}$ (DC1); and\

(2) comparing a local data-parity message-digest of a data fragment to a source data-parity message-digest of the data fragment in a data fragment zone (i.e., $CRC_{LOCAL\_DP}$ (DC1) is compared to $CRC_{SOURCE\_DP}$ (DC1).

There are two types of global data integrity verification operations:

(1) comparing a parity-fragment message-digest to a linear operation combination of data-parity message-digests of the source data in a parity fragment zone (i.e., $CRC_{PARITY}$ (DC4) is compared CRC ($CRC_{DP}$(DC1)$\oplus$ $CRC_{DP}$(DC2)$\oplus CRC_{DP}$(DC3)); and (2) comparing a source-data message-digest to a linear operation combination of data-fragment message-digests of the source data retrieved from the two or more data fragment zones (i.e., $CRC_{SOURCE}$ (BLOB) is compared to CRC ($CRC_{DF}$(DC1)$\oplus CRC_{DF}$(DC2)$\oplus CRC_{DF}$(DC3)).

In this regard, executing the hierarchical data integrity verification operations determines whether a match exists between the compared message-digests, thus verifying the data integrity of the corresponding source data of the message-digests.

As such, the embodiments described herein improve the computing operations, functionality, and the technological process for providing data integrity verification, in that, data integrity verification uses hierarchical data integrity verification operations based on message-digests that have a linear property for a linear operation. In particular, the ordered combination of steps for performing verification operations, the message-digests are designed to improve how the erasure coded data is stored and retrieved, and the interactions, for executing hierarchical data integrity verification, between components in a non-generic arrangement result in computing improvements and efficiency in providing data integrity verification for distributed computing systems.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
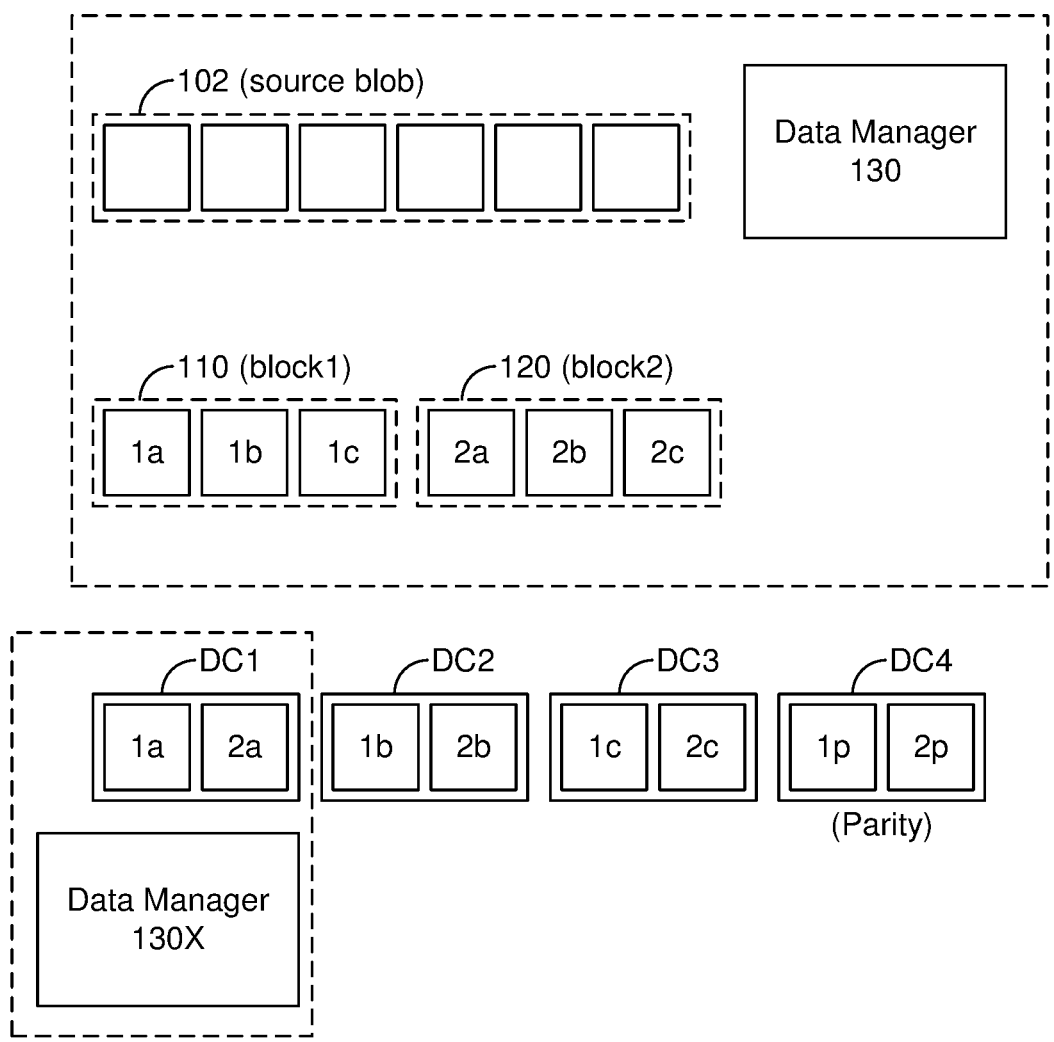
FIG. 1 is a block diagram of fragments in a hierarchical data integrity verification system, in accordance with embodiments described herein.

Users may use a distributed computing system or cloud computing platform to store and retrieve data that are used for different types of applications and services. For example, a user may store data in a file hosting service or other types of storage services, such as MICROSOFT OneDrive. The data may be stored in several different data formats in different types of stores. For example, the data may be a binary large object (blob) that is stored in a blob store. In particular, the blob (e.g., a source blob, source block, or source data) can be divided into data blocks that are each individually moved from the file hosting service store to a destination store. Processing the data for storage and transfer to different data stores can include some data management operations, objects, and data structures. For example, each data block may be associated with a block identifier (i.e., a block ID) to uniquely identify the data block for processing. When all blocks are uploaded to a designated destination store, a commit operation may be executed to finalize storing the blob based on the corresponding data blocks. Unfortunately, the process of dividing the blob into data blocks and transferring the data blocks for storage introduces the risk of corruption during the process.

Data integrity verification operations can be performed by a distributed computing system or storage system provider (e.g., file hosting service) to confirm that a source data matches destination data transferred to a destination store. The destination data will not match the source data if a data block is corrupted during the move operations or other processing. In a conventional data integrity verification implementation, the file hosting service can access or read the destination data from the destination store in order to verify that the destination data matches the source blob. Different methods may be used for data integrity verification between a source data and destination data. For example, the hosting service can retrieve the destination data and execute a Secure Hash Algorithm (SHA-1) to compute SHA-1 codes (i.e., SHA-1 message-digests) for the destination data and the source data to verify the integrity of the destination data.

Transferring the entire destination data to perform data verification operations is inefficient because of the cost of transferring the destination data back to the file hosting service in order to generate the SHA-1 message-digests to verify the data integrity of the destination data. To avoid incurring cross WAN network cost of reading the destination data, the SHA-1 message-digests may be computed at the destination store and not at the source data store. The SHA-1 message-digests can be communicated for verification against the SHA-1 codes of the source data.

Nonetheless, in some distributed computing systems, destination data are stored as erasure coded data to provide high availability and durability. For example, high availability and durability may be provided with efficient storing of redundant data based on erasure coded data. Blob data is erasure coded into erasure coded fragments and stored in different destination storage accounts, each destination storage account having a different erasure coded fragment. Because the erasure coded fragments are each different at each destination storage account, the SHA-1 message-digests cannot be computed for each destination data to verify against the SHA-1 codes of the source blob. In particular, SHA-1 is a cryptographic hash function that does not support data integrity verification for the different fragments of erasure coded data, as the SHA-1 codes otherwise would for non-erasure coded data. As such, improvements to the computing operations, functionality, and the technological process of providing data integrity verification in distributed computing systems can be defined to address the above-described limitations and other limitations in conventional systems.

Embodiments of the present invention are directed to simple and efficient methods, systems, and computer storage media for improving data integrity verification in a distributed computing system. At a high level, a data manager operates to perform hierarchical data integrity verification operations on message-digests that are associated based on a linear property of a non-cryptographic function. In particular, based on the linear property of the non-cryptographic hash function, data integrity of source data is verifiable from the message-digests (e.g., data-fragment message-digests, data-parity message-digests, or parity-fragment message-digests) and a linear operation.

The data manager accesses data fragments that are erasure coded fragments and accesses a parity fragment generated from the data fragments. The data fragments and the parity fragment correspond to source data. Using the non-cryptographic hash function, the data manager generates data-fragment message-digests, data-parity message-digests, and parity-fragment message-digests. The data manager stores the data fragments and corresponding data-fragment message-digests and data-parity message-digests at two or more data fragment zones and also stores a parity fragment and a corresponding parity-fragment message-digest at a parity fragment zone.

The data manager executes two different types of hierarchical data integrity verification operations: a local data integrity verification operation, and a global data integrity verification operation.

There are two types of local data integrity verification operations:

(1) comparing a local data-fragment message-digest of a data fragment to a source data-fragment message-digest of the data fragment in a data fragment zone (i.e., $CRC_{LOCAL\_DF}$ (DC1) is compared to $CRC_{SOURCE\_DF}$ (DC1); and (2) comparing a local data-parity message-digest of a data fragment to a source data-parity message-digest of the data fragment in a data fragment zone (i.e., $CRC_{LOCAL\_DF}$ (DC1) is compared to $CRC_{SOURCE\_DP}$ (DC1).

There are two types of global data integrity verification operations:

(1) comparing a parity-fragment message-digest to a linear operation combination of data-parity message-digests of the source data in a parity fragment zone (i.e. $CRC_{PARITY}$ (DC4) is compared CRC ($CRC_{DP}$(DC1)$\oplus$ $CRC_{DP}$(DC2)$\oplus$$CRC_{DP}$(DC3)); and (2) comparing a source-data message-digest to a linear operation combination of data-fragment message-digests of the source data retrieved from the two or more data fragment zones (i.e., $CRC_{SOURCE}$ (BLOB) is compared to CRC ($CRC_{DF}$(DC1)$\oplus$$CRC_{DF}$(DC2)$\oplus$$CRC_{DF}$(DC3)).

In this regard, executing the hierarchical data integrity verification operations determines whether a match exists between the compared message-digests, thus verifying the data integrity of the corresponding source data of the message-digests.

Embodiments of the present invention are discussed below with reference to specific examples and figures. As discussed, distributed computing systems can provide high availability and durability of data. For example, to provide high availability and durability of data (e.g., source blob), the source blob may be stored in multiple destination stores (e.g., blob stores or blob storage accounts). For example, the source blob in a file hosting service may be transferred, block by block, to two or more destination stores. The distributed computing system can also provide efficient storing of redundant data. High availability and durability may be provided with efficient storing of redundant data based on erasure coded data, where a blob data is erasure coded and stored in different destination storage accounts, each destination storage account having different erasure coded fragments.

By way of context, erasure coding, generally refers to error correction algorithms that function to recover from failures of stored data. Erasure coding divides an original data chunk into data fragments and uses the data fragments to generate parities (i.e., parity fragments), and then stores all the data fragments and parity fragments on different machines. Even with some data fragments being inaccessible, due to one machine being down, the data can still be reconstructed from a remaining set of available data fragments and parity fragments. Since additional storage is only for parity fragments of the original data, the storage overhead is much lower than data replication. For example, 3-1 XOR erasure coding scheme may be implemented, where a source blob is broken down into 3 equal data fragments and the data fragments are XORed to create a parity fragment. Various erasure coding schemes and operations are detailed in U.S. patent application Ser. No. 14/752,595, filed Jun. 26, 2015, entitled "FLEXIBLE ERASURE CODING WITH ENHANCED LOCAL PROTECTION GROUP STRUCTURES," which is herein incorporated by reference in its entirety.

With reference to FIG. 1, FIG. 1 includes source blob 102, block1 110, block2 120, data manager 130 and datacenters (DC1, DC2, DC3, and DC4) storing corresponding erasure coded fragments 1a, 2a, 1b, 2b, 1c, 2c, and 1p, 2p, respectively, as shown. The data manager 130 may refer to a computing device (e.g., client, virtual machine, and fabric controller) that initializes, causes, or triggers, remotely or in-place, the hierarchical data integrity verification operations described herein. It is contemplated the data operations may trigger operations from any datacenter or may operate with another data manager (i.e., a data manager 130X at a destination store datacenter) to perform hierarchical data verification operations described herein. Moreover, the source blob 102, block1 110, block2 120, data manager 130 may be located in any of the datacenters shown or another networked location.

In operation, the data manager 130 may access source blob 102. Source blob 102 may represent different types of data, files, objects, and file formats. For example, source blob 102 may be accessed from a file hosting service storing video files. In some embodiments, the source blob 102 can be divided into a predetermined size limit to accommodate data size restrictions for managing, transferring, and performing other operations in the distributed computing system based on the predetermined size limit. For example, a 120 MB source blob may be divided into a predetermined size 99 MB (e.g., block1 110) and a remainder 21 MB (e.g., block2 120).

The data manager 130 may operate to divide the source blob 102 into erasure coded fragments (i.e., data fragments and a corresponding parity fragment). The erasure coding operations can be performed at a block level, such that data fragments and parity fragments for the blocks are transferred to different destination stores, for example, storage accounts in location-redundant storage datacenters depicted as DC1, DC2, DC3 and DC4. In particular, a destination store may be a geographically distributed storage account for high availability and redundancy; however other types of storage accounts or storage zones are contemplated with embodiments of the present invention.

The storage accounts may specifically store data fragments (e.g., data fragment zones) and parity fragments (e.g., parity fragment zone). As shown, by way of example, each of the data fragment zones correspond to DC1, DC2, and DC3 that include one-third of the erasure coded data source blob 102. In particular, block1 110 and block2 120 have corresponding data fragments 1a, 2a, 1b, 2b, and 1c, 2c in DC1, DC2, and DC3 respectively. The parity fragment zone, DC4, includes parity fragments generated from the corresponding data fragments of block1 110 and block2 120. In particular, DC4 includes parity fragments 1p and 2p generated from 1a, 2a, 1b, 2b, and 1c, 2c using an erasure coding scheme.

Hierarchical data integrity verification operations support verifying the integrity of the source blob 102. For example, block1 110 and block2 120 may be verified based on message-digests of their corresponding erasure coded fragments. At a high level, a non-cryptographic function may be utilized to generate message-digests for the erasure coded fragments. The message-digests can refer to the output of the non-cryptographic function based on the corresponding data input. The message-digests generated based on the non-cryptographic function exhibit a linear property when combined based on an XOR logical operator. Advantageously, based on the linear property, a linear operation combination (e.g., an XOR combination) of specific message-digests can be determined and compared for data integrity verification of a source data corresponding to the message-digests.

By way of example, a CRC (cyclic redundancy check) non-cryptographic hash function is an error detecting code that can be used to detect accidental changes to raw data. CRC, as generally used herein, may refer to any of the different polynomial lengths, such as, 9 bits (CRC-8), 17 bits (CRC-16), 33 bits (CRC-32), and 65 bits (CRC-64). The CRC of data input is referred to as a CRC message-digest or simply a message-digest. CRC of erasure coded data (e.g., fragments) have the following linear property: CRC(a)⊕CRC(b)=CRC(a⊕b), where a and b represent erasure coded data.

Figure 2:
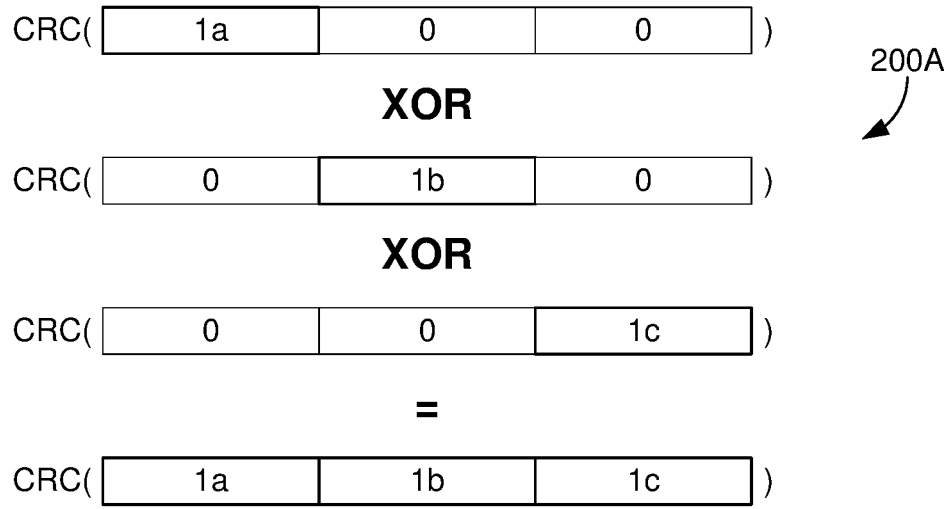
FIG. 2 is a block diagram of fragments in a hierarchical data integrity verification system, in accordance with embodiments described herein.
Figure 2:
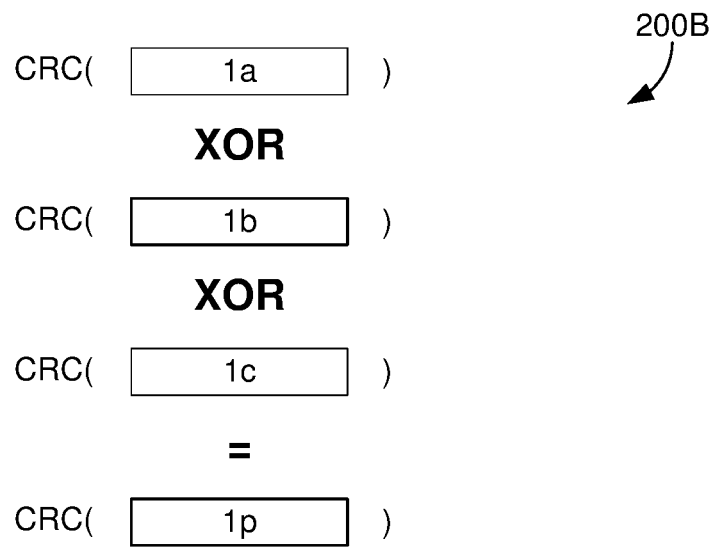

With reference to FIG. 2, hierarchical data integrity verification operations described herein are made possible in part due to the linear property depicted in data-based property 200A and parity-based property 200B. Hierarchical data integrity verification operations are performed using message-digests that are associated based on linear property of a non-cryptographic hash function. In particular, based on the linear property of the non-cryptographic hash function, data integrity of a source data is verifiable from the message-digests (e.g., data-fragment message-digests, data-parity message-digests, or parity-fragment message-digests) and a linear operation. The linear property manifests in two variations: a data-based property 200A and a parity-based property 200, discussed below in more detail.

Figure 3:
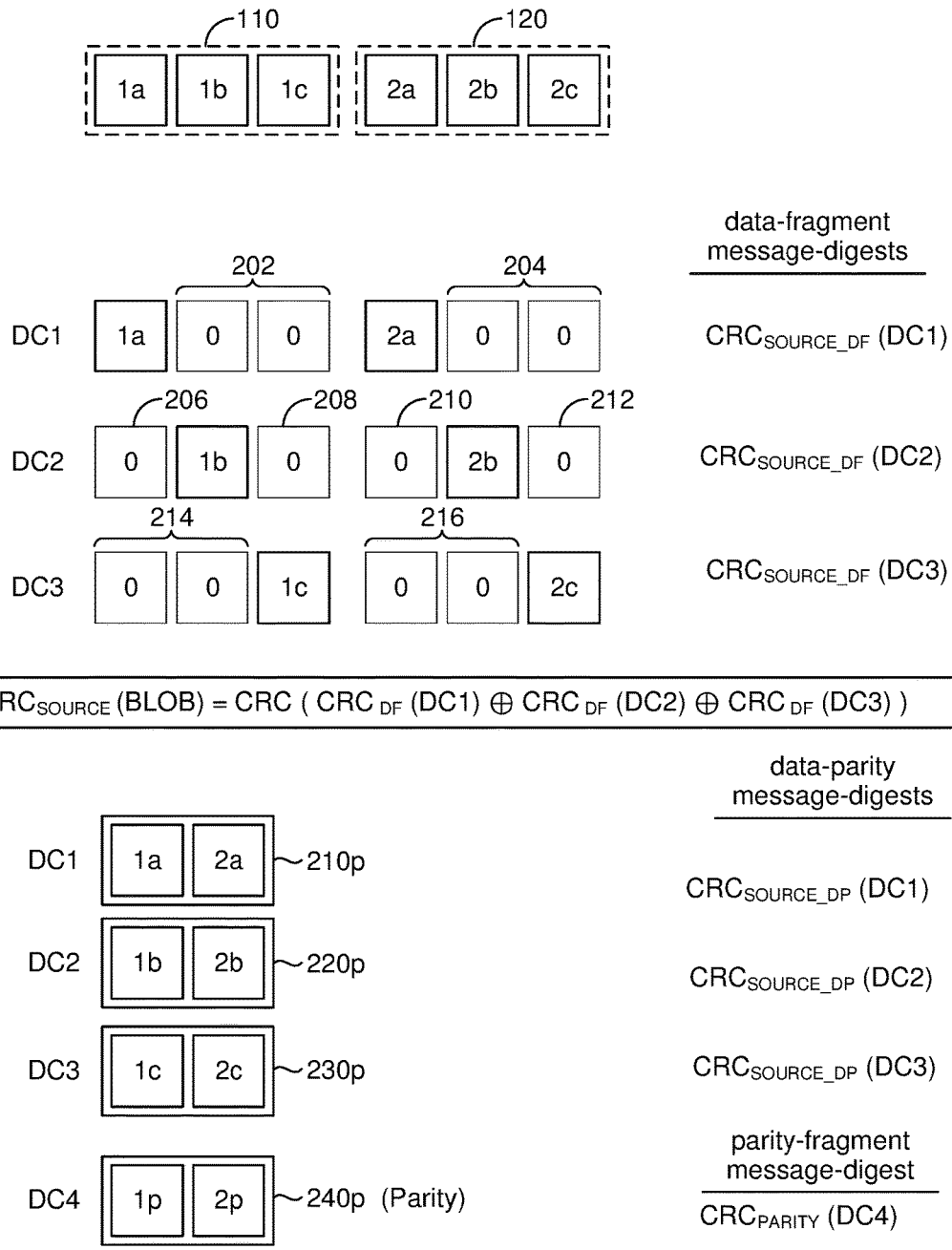
FIG. 3 is a block diagram of fragments in a hierarchical data integrity verification system, in accordance with embodiments described herein.

With reference to FIG. 3, FIG. 3 depicts data-fragment message-digests corresponding to the data-based property. FIG. 3 corresponds to FIG. 1, with FIG. 3 depicting block1 110, block2 120, data fragments 1a, 2a, 1b, 2b, and 1c, 2c in DC1, DC2, and DC3, padding 202, 204, 206, 208, 210, 212, 214, and 216 and 1p, 2p in DC 4. The data fragments having corresponding data-fragment message-digests: $CRC_{SOURCE\_DF}$ (DC1), $CRC_{SOURCE\_DF}$ (DC2), and $CRC_{SOURCE\_DF}$ (DC3). The data-based property may be associated with data-based integrity checking as represented by the following:

$$CRC_{SOURCE}(BLOB)=CRC(CRC_{DF}(DC1)\oplus CRC_{DF}(DC2)\oplus CRC_{DF}(DC3))$$

In other words, a concatenation of the CRCs of all data fragments correspond to the CRC of the blob. In particular, the concatenation is based on data fragments may be based in part on a pad-shift operation corresponding to the data fragments. The data-based integrity check corresponds to a global data integrity verification operation that includes a data manager comparing a source data message-digest to a linear operation combination of data-fragment message-digests of the source data retrieved from the datacenters (i.e., DC1, DC2 and DC3).

In operation, a data manager may generate and distribute the message-digests to the corresponding datacenters. In particular, the data manager may generate the data-based message-digests. The data manager may perform a pad-shift operation that includes adding paddings via shifting to the data fragments. For example, 1a corresponds to padding portion 202 and 2a corresponds to padding portion 204. Padding portion may be a composite padding portion having a first padding portion and a second padding portion sized similar to 206 and 208. In addition, 1b corresponds to padding portions 206 and 208 and 2b corresponds to padding portions 210 and 212, and 1c corresponds to padding portion 214 and 2c corresponds to padding portion 216. As depicted, the padding portions may take several different configurations where the blocks are either before, in-between, or after the padding portions as depicted. Other variations and combinations of padding portions that achieve the linear property described herein are contemplated with embodiments of the present invention.

With continued reference to FIG. 3, FIG. 3 further depicts data-parity message-digests and a parity-fragment message-digest corresponding to the parity-based property. FIG. 3 further includes data fragments 210p, 220p, 230p and corresponding data-parity message-digests (i.e., $CRC_{SOURCE\_DP}$ (DC1), $CRC_{SOURCE\_DP}$ (DC2), $CRC_{SOURCE\_DP}$ (DC3)) and parity fragment 240p and corresponding parity-fragment message-digest (i.e., $CRC_{PARITY}$ (DC4)). As shown, 210p, 220p, 230p, and 240p collectively include corresponding portions from both block1 110 and block2 120. The parity-based property may be associated with parity-based integrity checking as represented by the following:

$$CRC_{PARITY}(D4)=CRC(CRC_{DP}(DC1)\oplus CRC_{DP}(DC2)\oplus CRC_{DP}(DC3))$$

In other words, using the erasure coding scheme, the data fragments are used to generate the parity fragment by XORing the data fragments. The parity-based integrity check corresponds to cross-DC global data integrity verification operations that include comparing a source parity-fragment message-digest to a linear operation combination of data-parity message-digests of the source data in a parity fragment zone. As such, the data integrity of the parity fragment may be determined by calculating the CRC of all the data fragments, calculating an XOR of all the CRCs of all the data fragments, and comparing the XOR of the CRC of all the data fragments to the CRC of the parity fragment.

Figure 4:
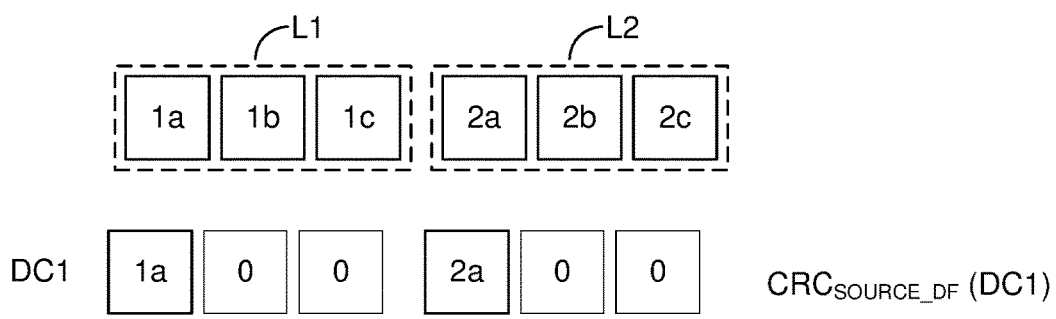
FIG. 4 is a block diagram of fragments in a hierarchical data integrity verification system, in accordance with embodiments described herein.

With reference to FIG. 4, FIG. 4 depicts the erasure coded fragments 1a, 1b, 1c and 2a, 2b, 2c, and DC1 having two message-digests: a data-based message-digest— $CRC_{SOURCE\_DF}$ (DC1) and a data-parity message-digest— $CRC_{SOURCE\_DP}$ (DC1). The data-based integrity check corresponds to local data integrity verification operations that include either comparing a local data-fragment message-digest of a data fragment to a source data-fragment message-digest of the data fragment in DC1, or comparing a local data-parity message-digest of the data fragment to a source data-parity message-digest of the data fragment in DC1.

In operation, a data manager may generate and distribute either or both types of message-digests to corresponding datacenters. The data manager may access 1a and 2a to generate a source data-based message-digest and a source data-parity message-digest. The message-digests are communicated to DC1. By of example, CRC(1a) & CRC(2a) may be embedded in individual block IDs and the data manager may specifically calculate and embed the two message-digests as metadata, as represented by:

$$CRC_{SOURCE\_DF}(DC1)=CRC(CRC(1a)<<(2L1+3L2)\oplus CRC(2a)<<(2L2)) \text{ and}$$

$$CRC_{SOURCE\_DP}(DC1)=CRC(CRC(1a)<<(L2)\oplus CRC(2a))$$

When the message-digests are received at DC1, the data manager can verify corresponding data based on comparing message-digests (i.e., a $CRC_{LOCAL\_DF}$ (DC1) is compared to $CRC_{SOURCE\_DF}$ (DC1) or $CRC_{LOCAL\_DP}$ (DC1) is compared to $CRC_{SOURCE\_DP}$ (DC1).

In one example embodiment, the hierarchical data integrity verification system implements supplemental data processing validation operations for error detection based on the non-cryptographic hash function and the cryptographic hash function. In particular, the data processing validation operations are executed for data and erasure coded fragments being divided and moved around different data stores. For example, for blocks transferred from a source blob data store to a destination store, data processing validation operations (e.g., blob move checks) may be performed during the data transfer process. By way of context, because of the properties of the non-cryptographic hash function (e.g., CRC), the error detection rate goes down as the data object size grows. For example, CRC64 as a checksum for larger objects may at times result in collisions, as such a distributed computing system may implement a predetermined size limit (e.g., less than 100 mb) for use with the non-cryptographic hash function as checksum for validation operations. The validation operations may specifically be performed at steps during data processing (or transfer).

Figure 5:
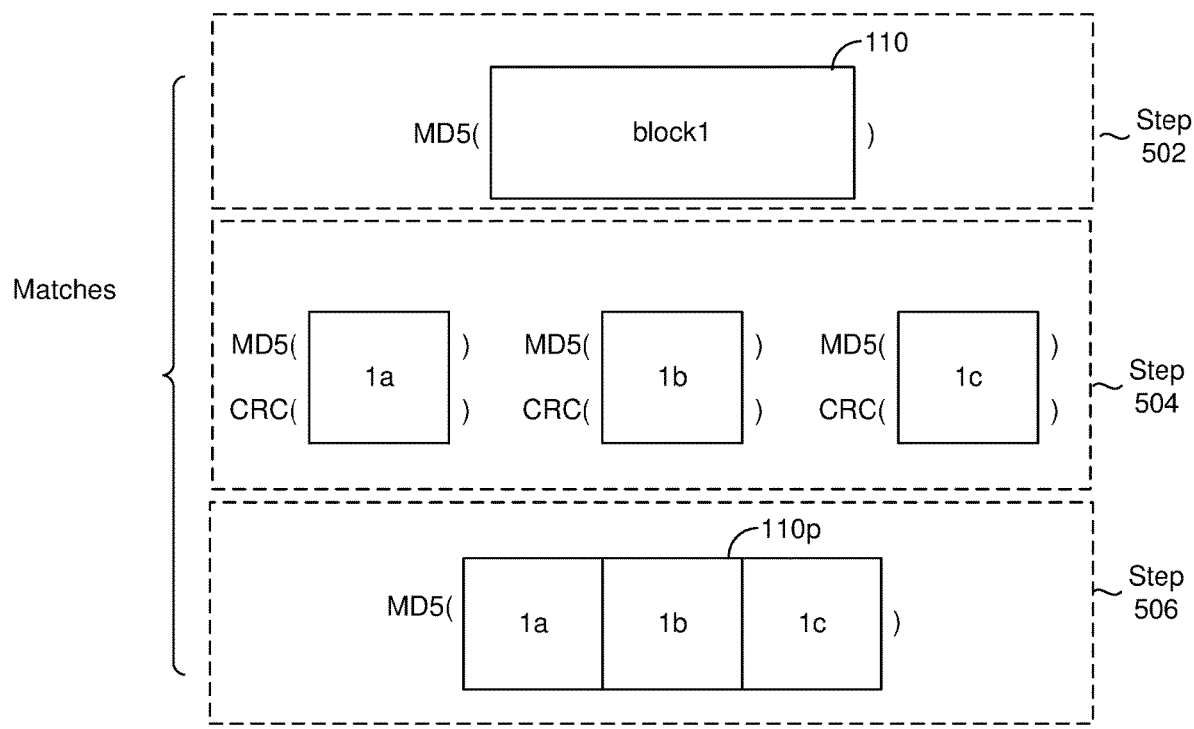
FIG. 5 is a block diagram of fragments in a hierarchical data integrity verification system, in accordance with embodiments described herein.

With reference to FIG. 5, FIG. 5 includes block1 110, and 1a, 1b, and 1c and concatenated 1a, 1b and 1c, collectively 110p. The hierarchical data integrity verification system with data processing validation operations can be implemented with a cryptographic hash function (e.g., MD5 message-digest algorithm) and a non-cryptographic hash function (e.g., CRC). The data processing validation operations can be implemented either with the hashes calculated in advance or the hashes may also be calculated in real time. In operation, a data manager can access block1 110 and at step 502 generate a hash of block1 110 using a MD5. To ensure that the MD5s are calculated using uncorrupted data, a SHA-1 of aggregated blocks may also be calculated and compared with the SHA-1 of the original blob. If the SHA-1s match, this operates as an indication that the MD5s are computed using uncorrupted data.

With MD5 of block1 110 calculated, block1 110 can be split into equal size fragments. An erasure coding operation using an erasure coding scheme is executed on block1 110. For example, a 3-1 XOR scheme may be implemented as part of the erasure coding operation. For each fragment, the data manager may calculate one or both types of message-digests (i.e., data-fragment message-digest—$CRC_{SOURCE\_DF}$ (DC1) and/or a data-parity message-digest–$CRC_{SOURCE\_DP}$ (DC1) and also calculate the corresponding MD5. As shown, at step 504, the data manager may calculates the $CRC_{source\_DP}$ and MD5 for blocks 1a, 1b, 1c (not shown is the calculation of $CRC_{SOURCE\_DF}$ and corresponding MD5). To ensure that the CRC and the MD5 are calculated using uncorrupted data, the data manager, at step 506, may calculate the MD5 of the aggregated fragments.

Figure 6:
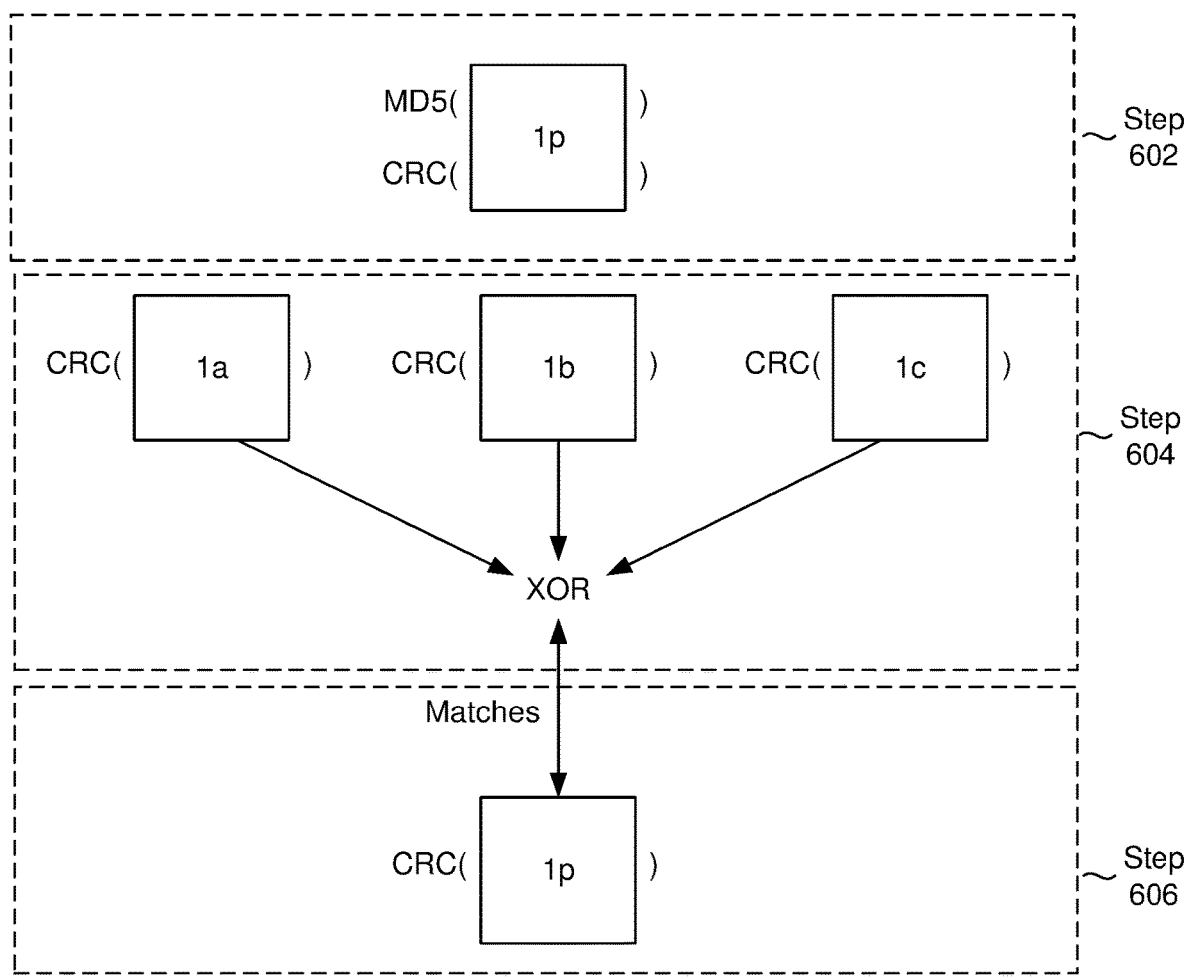
FIG. 6 is a block diagram of fragments in a hierarchical data integrity verification system, in accordance with embodiments described herein.

With reference to FIG. 6, as discussed, the data manager may also generate the parity fragment 1p by XORing the data fragments. The data manager, at step 602, may compute the CRC and the MD5 of the parity fragment. To ensure that the parity fragment is not corrupted, the data manager may leverage, at step 604, the linear property of the CRC, to match, at step 606, the CRC with the XOR of all the CRCs of all the data fragments. For example, $CRC_{PARITY}$ (1p) =$CRC(CRC_{DF}(1a) \oplus CRC_{DF}(1b) \oplus CRC_{DF}(1c))$.

The data manager operates to transmit each fragment to a corresponding storage account. Additional metadata, discussed herein, such as CRCs, fragment size and padding bytes that are added to fragments are also communicated to the corresponding storage accounts. A storage account may be associated with a specific and different datacenter. In particular, the MD5 message-digest is communicated, such that the data manager (or a local data manager) can verify the integrity of the fragment at the storage account against the MD5. If the integrity of the fragment cannot be verified (i.e., a mismatch between the source MD5 and a local MD5 of the fragment), then the operation to store the fragment in the storage account fails. As such, the transformation from the source blob to the blocks are verified using SHA-1 and MD5. The transformation from the individual blocks to the encoded fragments are verified using MD5 and CRC.

Advantageously, the embodiments described herein improve the computing operations, functionality, and the technological process for providing data integrity verification, in that, data integrity verification uses hierarchical data integrity verification operations based on message-digests that have a linear property for an XOR logical operator. For example, the ordered combination of steps for performing verification operations, the message-digests designed to improve how the erasure coded data is stored and retrieved, and the interactions, for executing hierarchical data integrity verification, between components in a non-generic arrangement, result in computing improvements and efficiency in providing data integrity verification for distributed computing systems.

In particular, improvements are achieved over conventional solutions that incur significant network cost associated with transferring the transferred data blocks back from their storage zones to verify the integrity with the original data. Additionally, instead of transferring blocks of data only message-digests that are much smaller in size are transferred, as described herein. Moreover, improvements are also achieved over conventional cryptographic hash functions that do not adequately support erasure coded fragments, because unlike non-erasure coded data that are stored as duplicates, each of the erasure coded fragments is different. In the current implementation, a non-conventional combination of hierarchical data integrity verification operations are executed using message-digests that are associated based on a linear property of a non-cryptographic function and arranged, communicated, and retrieved in a particular manner in distributed computing system storage zones. The linear property of the non-cryptographic hash function, data integrity of source data is verifiable from the message-digests (e.g., data-fragment message-digests, data-parity message-digests, or parity-fragment message-digests) and a linear operation. Overall, these improvements result in less CPU computation, smaller memory requirements, and increased flexibility in data integrity verification.

Figure 7:
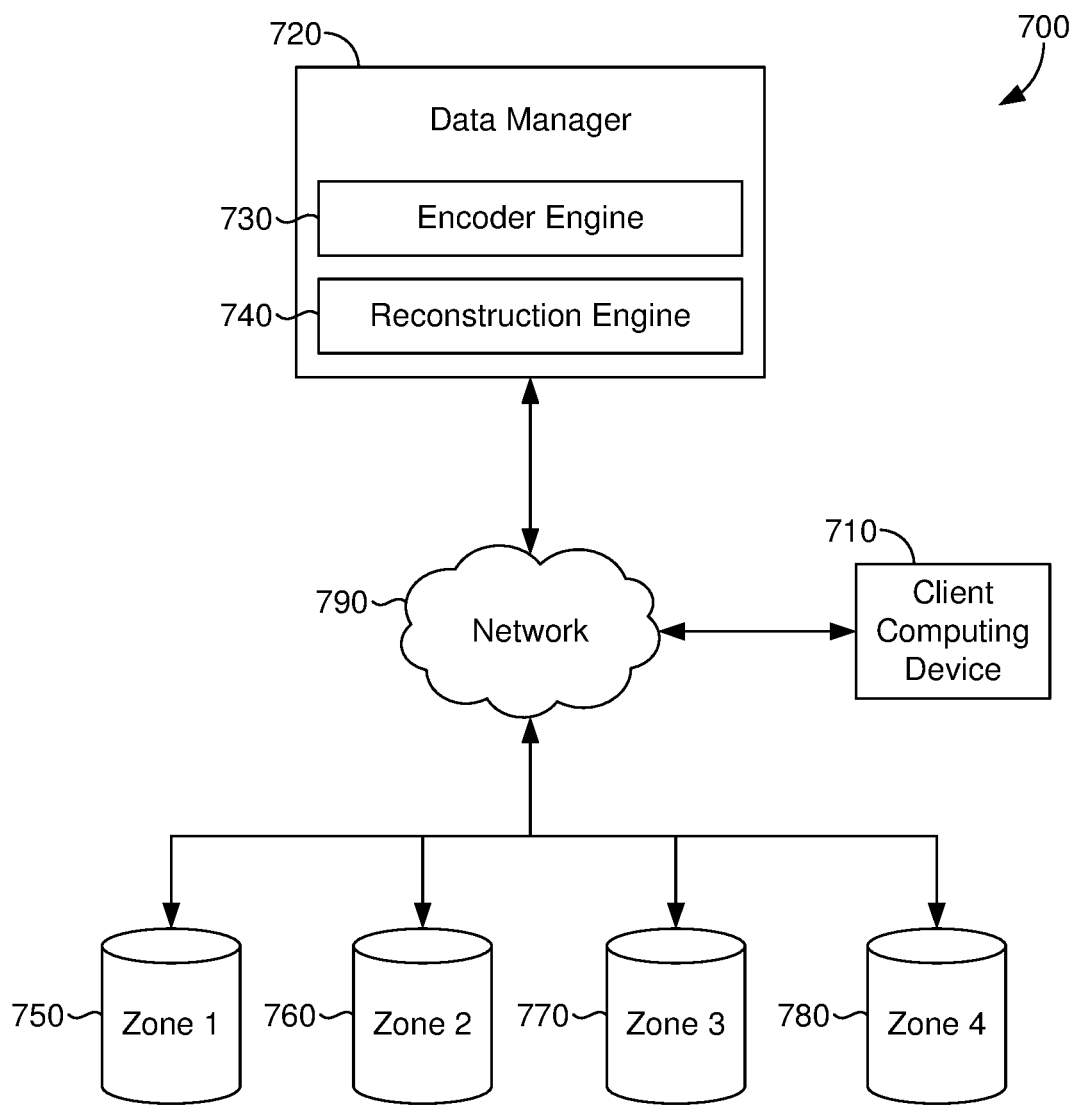
FIG. 7 is a block diagram of an example hierarchical data integrity verification system environment, in accordance with embodiments described herein.

With reference to FIG. 7, embodiments of the present disclosure can be discussed with reference to an example hierarchical data integrity verification system 700 that is distributed computing system environment that is an operating environment for implementing functionality described herein. FIG. 7 shows a high level architecture of a hierarchical data integrity verification system 700 having components in accordance with implementations of hierarchical data integrity verification of the present disclosure. The hierarchical data integrity verification system 700 corresponds to the distributed computing system described herein with reference to FIG. 12. Among other managers, components, or engines ("collectively components") not shown, hierarchical data integrity verification system 700 includes client computing device 710, data manager 720 having encoder engine 730 and reconstruction engine 740. The hierarchical data integrity verification system 700 further includes zone 750, zone 2 760, zone 3 770, zone 4 780, and network 790. In combination, the components of the hierarchical data integrity verification system support functionality of the hierarchical data integrity verification system 700 as described herein in more detail. Each of the identified components may represent a plurality of different instances of the component. The components of the distributed computing system 100 may communicate with each other over one or more networks (e.g., public network or virtual private network "VPN"). The network (not shown) may include, without limitation, one or more local area networks (LANs) and/or wide area networks (WANs). The client computing device 710 may be used to perform hierarchical data integrity data operations described herein. For example, data manager 720 may be a type of client computing device. The client computing device 710 may include any type of computing device, such as the computing device 1300 described with reference to FIG. 13, for example. A plurality of client computing devices 710 may be associated with the hierarchical data integrity verification system 700.

The data manager 720 of FIG. 7 is generally configured to receive and communicate information for hierarchical data integrity verification operations. The data manager 130 may refer to a computing device (e.g., client, virtual machine, and fabric controller) that initializes, causes, or triggers, remotely or in-place, the hierarchical data integrity verification operations described herein. Hierarchical data integrity verification operations may also include, communications (e.g., requests for encoding or reconstructing data) and/or actual data chunks that are encoded with an erasure coding scheme described herein. As illustrated, the data manager 720 includes an encoder engine 730 and a reconstruction engine 740. The data manager 720 has access to the different zones. For example, the data manager 720 may receive and send data (e.g., data chunks) to the different zones. Data chunks may be data that need to be encoded, have been encoded, or may be data that have been recovered.

An embodiment of the present invention may include a plurality of data managers each associated with several zones, where data at the zones is processed according to embodiments of the present invention. As discussed herein, zones may refer to particular buildings, data centers, and geographic regions providing a storage service. For example, a data center may be implemented as a distributed computing system store that is configured to allocate virtual machines within the data center for use by a service application. Erasure coding across multiple zones encompasses providing erasure coding at any level of fault tolerance defined by the storage service in the zone. It will be understood and appreciated by those of ordinary skill in the art that the information stored in association with the zone may be configurable and may include any information relevant to, among other things, erasure coding data including data chunks, local parities, and zone parities. The content and volume of such information are not intended to limit the scope of embodiments of the present invention in any way.

Figure 8:
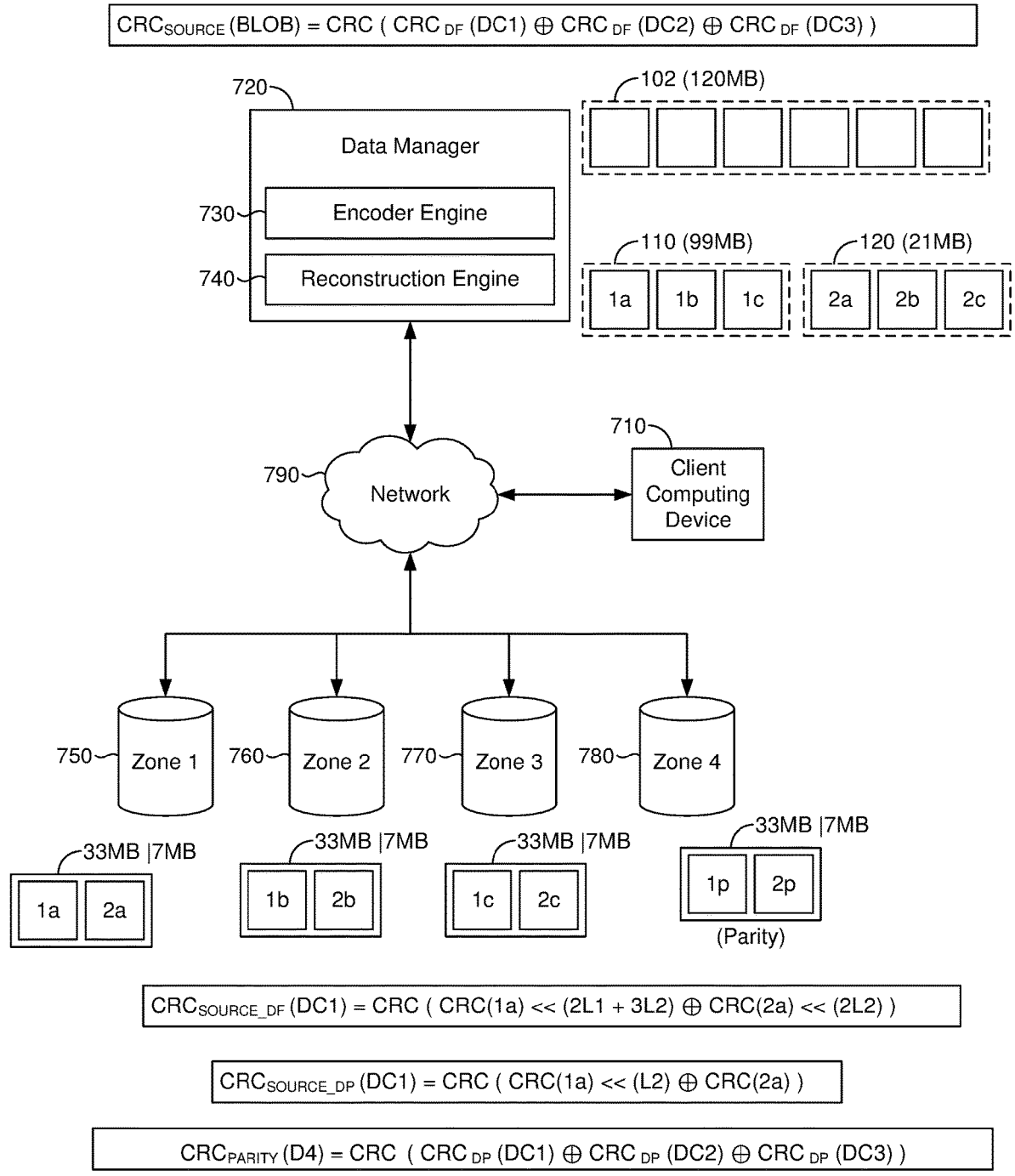
FIG. 8 is a block diagram of an example hierarchical data integrity verification system environment, in accordance with embodiments described herein.

With reference to FIG. 8, FIG. 8 illustrates a block diagram of a hierarchical data integrity verification system 700. FIG. 8 includes similar components shown in FIG. 7 and additional components supporting functionality of the hierarchical data integrity verification system 700. FIG. 8 further includes source blob 102 (120 MB), block1 110 (99 MB), block2 120 (21 MB), and zones storing corresponding erasure coded fragments (33 MB and 7 MB each) $1a$, $2a$, $1b$, $2b$, $1c$, $2c$, and $1p$, $2p$, respectively, as shown.

At a high level, different types of data blocks and message-digests are stored, generated, retrieved, and accessed at different locations in order to provide data integrity verification in accordance with embodiments of the present invention. In particular, message-digests are processed within a datacenter or across datacenters during data integrity verification. In operation, the data manager 720 may reside in the same source location (e.g., zone or datacenter) as blob data (i.e., source blob 102) while each of the zones (i.e., zone 1, zone 2, zone 3, and zone 4) may correspond to datacenters (e.g., DC1, DC2, DC3, and DC4). The source blob, source data fragments, source parity fragments, data-fragment message-digests, data-parity message-digest, and are initially stored in the source location and selectively transferred to corresponding data centers such that data integrity verification can be executed based on local data integrity verification operations and global integrity verification operations.

The datacenters are used to store data blocks and message-digests that are selectively transferred from the source location. For example, DC1 receives and stores data fragments $1a$ and $2a$, message-digests $CRC_{SOURCE\_DF}$ (DC1) and $CRC_{SOURCE\_DP}$ (DC1), DC2 receives and stores data fragments $1b$ and $2b$, message-digests $CRC_{SOURCE\_DF}$ (DC2) and $CRC_{SOURCE\_DP}$ (DC2), DC3 receives and stores data fragments $1c$ and $2c$, message-digests $CRC_{SOURCE\_DF}$ (DC3) and $CRC_{SOURCE\_DP}$ (DC3), and DC4 receives and stores parity fragments $1p$ and $2p$, message-digest $CRC_{PARITY}$ (DC4). Also stored at the datacenters are locally generated local message-digests from the data fragments (i.e., $CRC(1a)$, $CRC(2a)$, $CRC(1b)$, $CRC(2b)$, and $CRC(1c)$, $CRC(2c)$).

As discussed, there are two types of data integrity verification operations: local data integrity verification and global integrity verification. With respect to local data integrity verification, with reference to DC1, data fragment $1a$ is verified against $CRC(1a)$, data fragment $2a$ is verified against $CRC(2a)$ where the data fragments and the CRCs are accessed within the datacenter. Further, $CRC_{SOURCE\_DF}$ (DC1) is verified against locally generated message-digests $CRC(1a)$ & $CRC(2a)$ and $CRC_{SOURCE\_DP}$ (DC1) is verified against $CRC(1a)$ & $CRC(2a)$ while accessing all the CRCs within the region. Only CRCs within DC1 are accessed, in other words, no data blocks (e.g., data fragments or parity fragments) are accessed for the local verification operations.

By way of illustration, $CRC_{SOURCE\_DF}$ (DC1)=$CRC(CRC(1a)<<(2L1+3L2) \oplus CRC(2a)<<(2L2))$ and $CRC_{SOURCE\_DP}$ (DC1)=$CRC(CRC(1a)<<(L2) \oplus CRC(2a))$ as such the locally generated CRCs (i.e., $CRC_{LOCAL\_DF}$ (DC1) and $CRC_{LOCAL\_DP}$ (DC1)) can be generated based on linear operation combinations using XOR and shift such that the source data-fragment message-digests and data-parity message-digests are compared and verified using the local data-fragment message-digests and the local data-parity message-digests (i.e., $CRC_{LOCAL\_DF}$ (DC1) is compared to $CRC_{SOURCE\_DF}$ (DC1) and $CRC_{LOCAL\_DP}$ (DC1) is compared to $CRC_{SOURCE\_DP}$ (DC1)).

With respect to global data integrity verification, by way of illustration, $CRC_{SOURCE\_DF}$ (DC_i) (for i=1 . . . 3) are verified against $CRC_{SOURCE}$ (BLOB), for example at the source location, where only the CRCs are accessed across the datacenters. As such, $CRC_{SOURCE}$ (BLOB) is compared to CRC ($CRC_{DF}$(DC1)⊕$CRC_{DF}$(DC2)⊕$CRC_{DF}$(DC3)). Further, by way of illustration $CRC_{SOURCE}$ DP (DC_i) (for i=1 . . . 3) are verified against $CRC_{PARITY}$ (DC4), also where only the CRCs are accessed across datacenters. As such, $CRC_{PARITY}$ (DC4) is compared to CRC ($CRC_{DP}$(DC1)⊕$CRC_{DP}$(DC2)⊕$CRC_{DP}$(DC3)). Accordingly, no data blocks are accessed across datacenters during global data integrity verification. In this regard, executing the hierarchical data integrity verification operations is determined based on whether a match exists between the compared message-digests, thus verifying the data integrity of the corresponding source data of the message-digests.

Example Flow Diagrams

Figure 9:
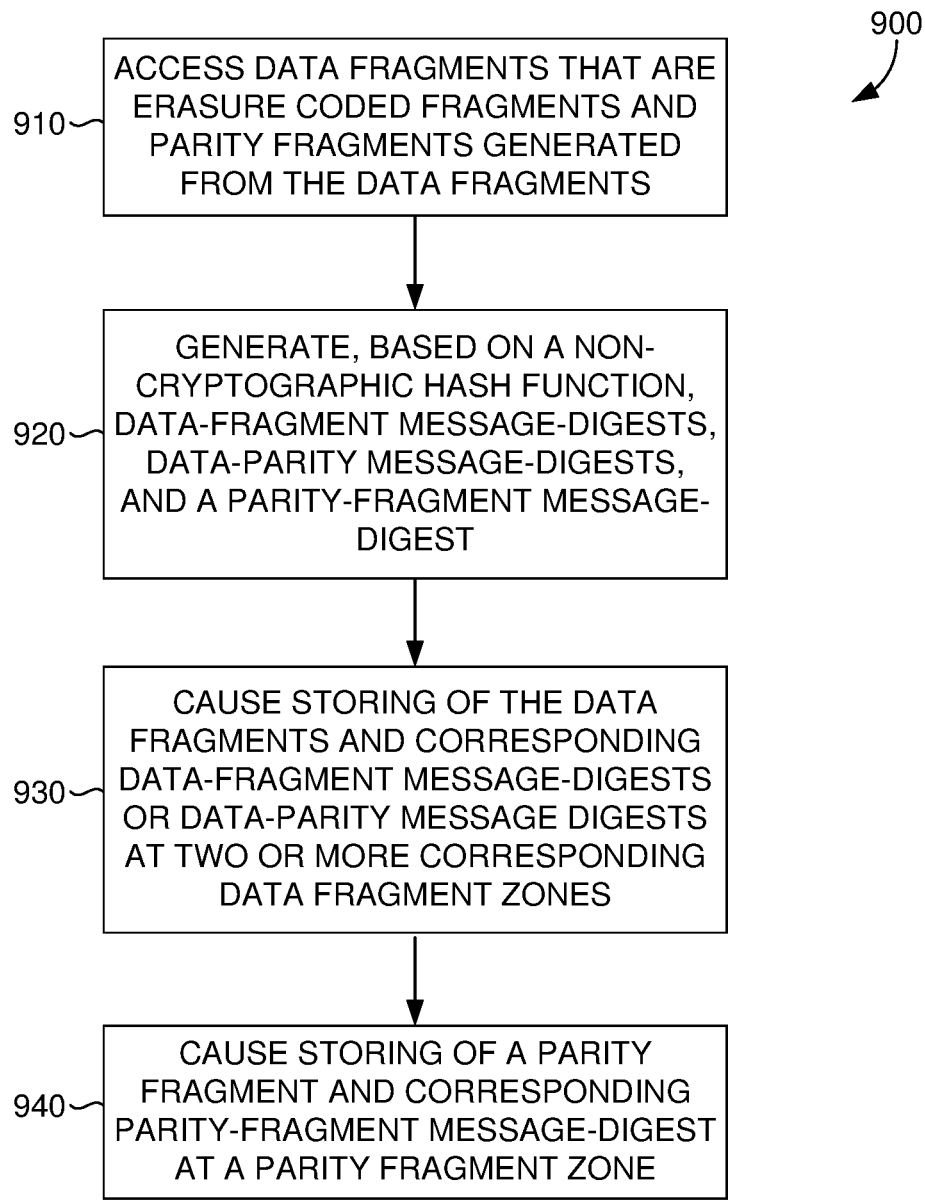
FIG. 9 is a flow diagram showing an example method for providing a hierarchical data integrity verification system, in accordance with embodiments described herein.
Figure 10:
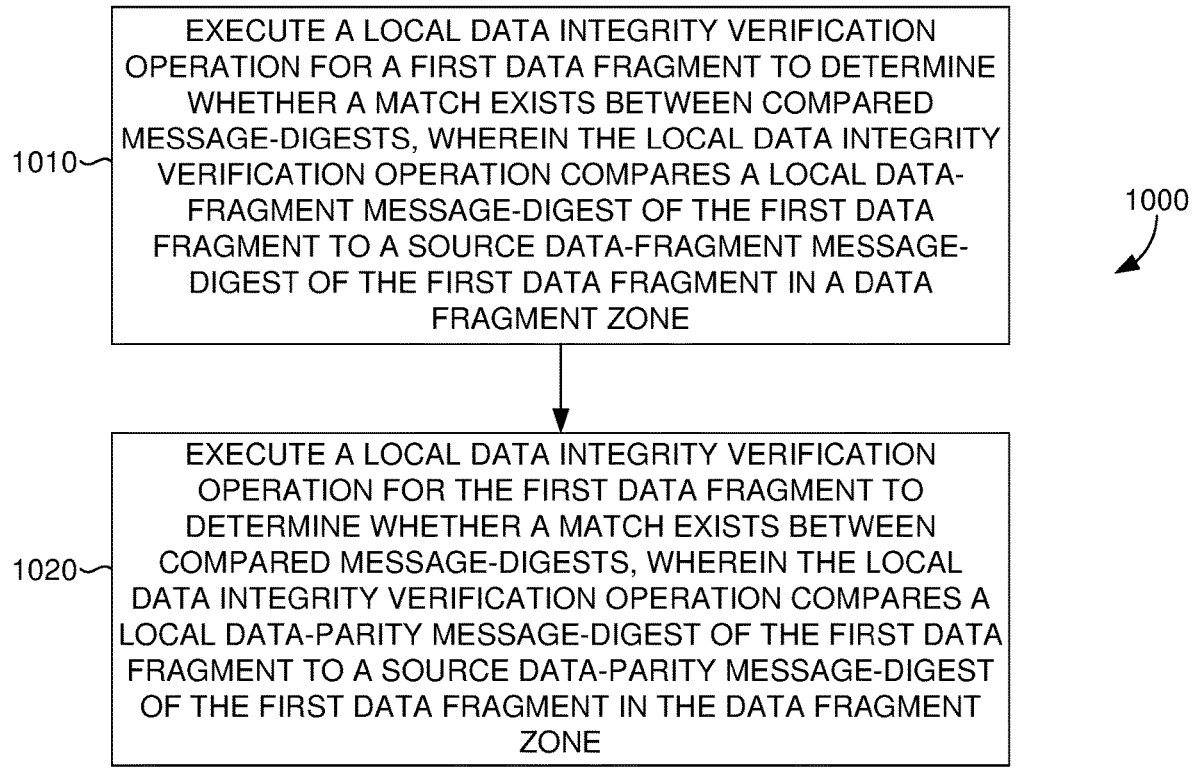
FIG. 10 is a flow diagram showing an example method for providing a hierarchical data integrity verification system, in accordance with embodiments described herein.
Figure 11:
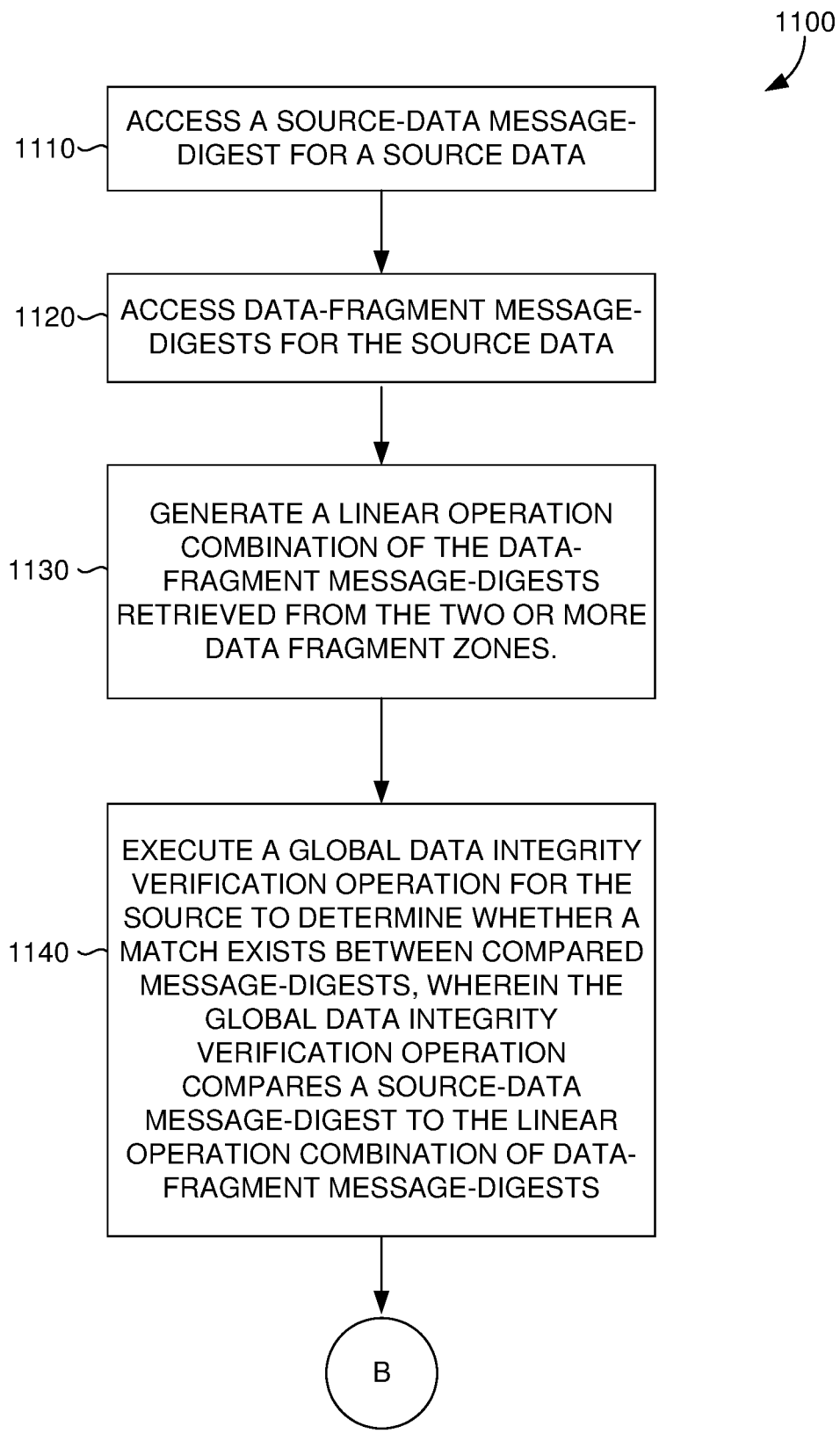
FIG. 11 is a flow diagram showing an example method for providing a hierarchical data integrity verification system, in accordance with embodiments described herein.
Figure 11:
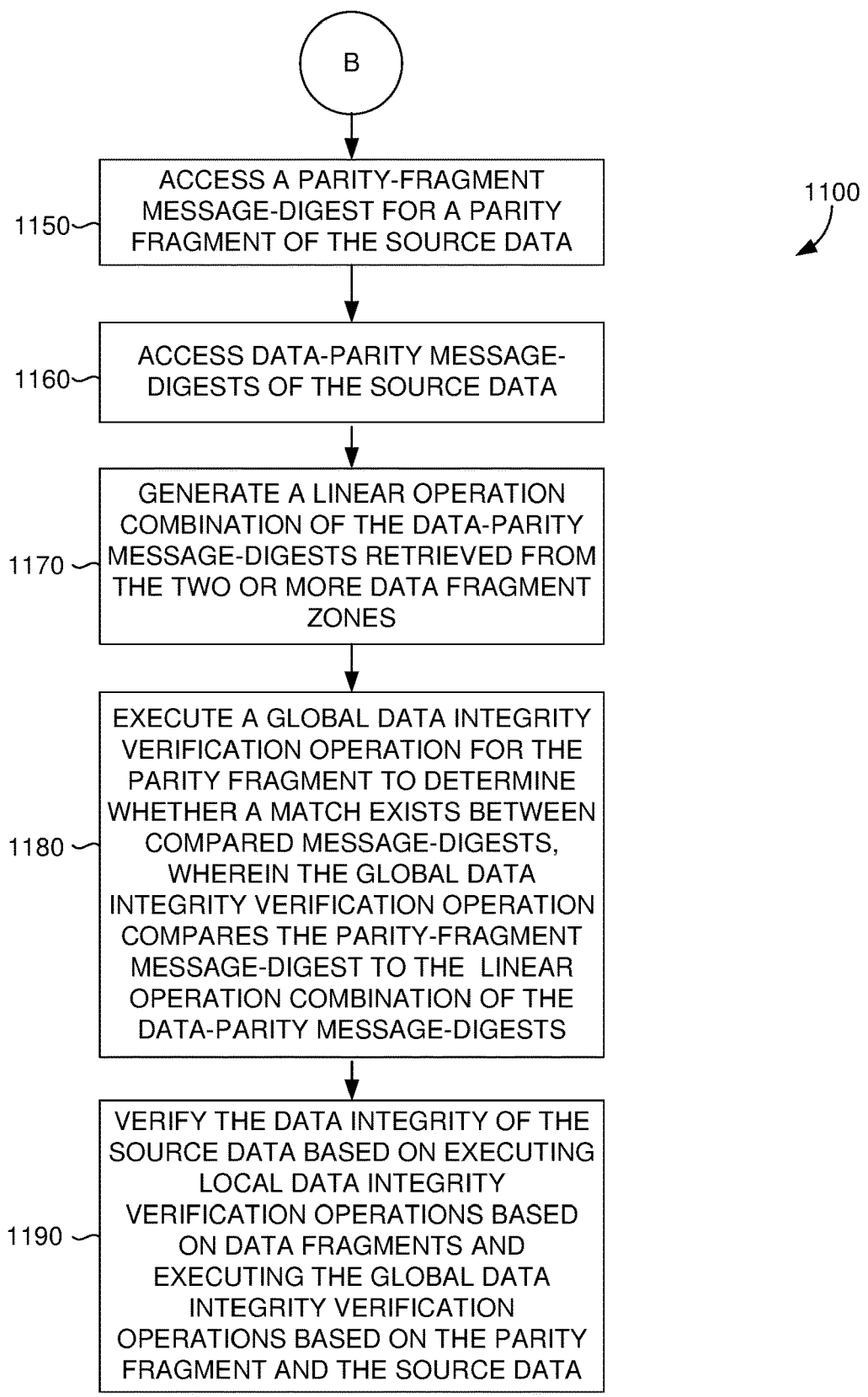

With reference to FIGS. 9, 10 and 11, flow diagrams are provided illustrating methods for providing a hierarchical data integrity verification system. The methods can be performed using the hierarchical data integrity verification system described herein. In embodiments, one or more computer storage media having computer-executable instructions embodied thereon can, when executed by one or more processors, cause the one or more processors to perform the methods in the hierarchical data integrity verification system.

With reference to FIG. 9, initially at block 910, data fragments and a parity fragment are accessed. The data fragments are erasure coded fragments of source data and the parity fragment is generated based on the data fragments. At block 920, based on a non-cryptographic hash function, data-fragment message-digests, data-parity message-digests, and a parity-fragment message-digest are generated. At block 930, the data fragments and corresponding data-fragment message-digests or data-parity message-digests are stored in two or more corresponding data fragment zones. At block 940, a parity fragment and corresponding a parity-fragment message-digest are stored at a parity fragment zone.

With reference to FIG. 10, initially at block 1010, a local data integrity verification operation for a first data fragment is executed to determine whether a match exists between compared message-digests. The local data integrity verification operation compares a local data-fragment message-digest of the first data fragment to a source data-fragment message-digest of the first data fragment in a data fragment zone.

At block 1020, a local data integrity verification operation for the first data fragment is executed to determine whether a match exists between compared message-digests. The local data integrity verification operation compares a local data-parity message-digest of the first data fragment to a source data-parity message-digest of the first data fragment in the data fragment zone.

With reference to FIG. 11, initially at block 1110, a source-data message-digest for a source data is accessed. At block 1120, data-fragment message-digests for the source data are accessed. At block 1130, a linear operation combination of the data-fragment message-digests is generated for data-fragment message-digests retrieved from the two or more data fragment zones. At block 1140, a global data integrity verification operation for is executed for the source data to determine whether a match exists between compared message-digests. The global data integrity verification operation compares a source-data message-digest to the linear operation combination of the data-fragment message-digests.

At block 1150, a parity-fragment message-digest for a parity fragment of the source data is accessed. At block 1160, the data-parity message-digests for the source data are accessed. At block 1170, a linear operation combination of the data-parity message-digests is generated for data-parity message-digests retrieved from the two or more data fragment zones. At block 1180, a global data integrity verification operation is executed for the parity fragment to determine whether a match exists between compared message-digests. The global data integrity verification operation compares the parity-fragment message-digest to the linear operation combination of the data-fragment message-digests. At block 1190, the source data integrity is verified based on executing the local data integrity verification operations based on the data fragments and the parity fragment and executing the global data integrity verification operations based on the parity fragment and the source data.

Example Distributed Computing Environment

Figure 12:
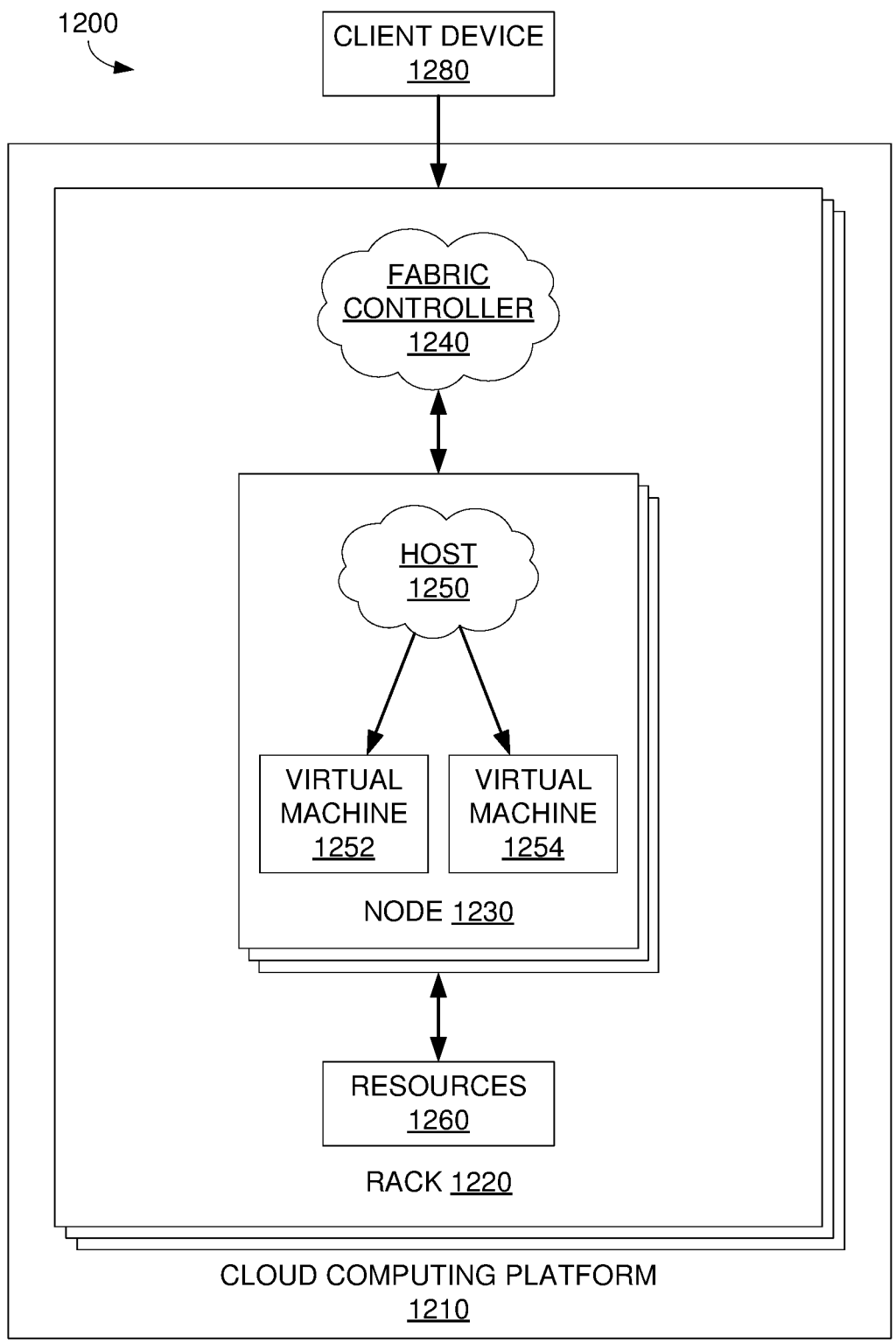
FIG. 12 is a block diagram of an example distributed computing system environment suitable for use in implementing embodiments described herein.

Referring now to FIG. 12, FIG. 12 illustrates an example distributed computing environment 1200 in which implementations of the present disclosure may be employed. In particular, FIG. 12 shows a high level architecture of the secrets management system ("system") in cloud computing platform 1210, where the system supports seamless modification of software component. It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions, etc.) can be used in addition to or instead of those shown.

Data centers can support distributed computing environment 1200 that includes cloud computing platform 1210, rack 1220, and node 1230 (e.g., computing devices, processing units, or blades) in rack 1220. The system can be implemented with cloud computing platform 1210 that runs cloud services across different data centers and geographic regions. Cloud computing platform 1210 can implement fabric controller 1240 component for provisioning and managing resource allocation, deployment, upgrade, and management of cloud services. Typically, cloud computing platform 1210 acts to store data or run service applications in a distributed manner. Cloud computing infrastructure 1210 in a data center can be configured to host and support operation of endpoints of a particular service application. Cloud computing infrastructure 1210 may be a public cloud, a private cloud, or a dedicated cloud.

Node 1230 can be provisioned with host 1250 (e.g., operating system or runtime environment) running a defined software stack on node 1230. Node 1230 can also be configured to perform specialized functionality (e.g., compute nodes or storage nodes) within cloud computing platform 1210. Node 1230 is allocated to run one or more portions of a service application of a tenant. A tenant can refer to a customer utilizing resources of cloud computing platform 1210. Service application components of cloud computing platform 1210 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 1230, nodes 1230 may be partitioned into virtual machines (e.g., virtual machine 1252 and virtual machine 1254). Physical machines can also concurrently run separate service applications. The virtual machines or physical machines can be configured as individualized computing environments that are supported by resources 1260 (e.g., hardware resources and software resources) in cloud computing platform 1210. It is contemplated that resources can be configured for specific service applications. Further, each service application may be divided into functional portions such that each functional portion is able to run on a separate virtual machine. In cloud computing platform 1210, multiple servers may be used to run service applications and perform data storage operations in a cluster. In particular, the servers may perform data operations independently but exposed as a single device referred to as a cluster. Each server in the cluster can be implemented as a node.

Client device 1280 may be linked to a service application in cloud computing platform 1210. Client device 1280 may be any type of computing device, which may correspond to computing device 1200 described with reference to FIG. 12, for example. Client device 1280 can be configured to issue commands to cloud computing platform 1210. In embodiments, client device 1280 may communicate with service applications through a virtual Internet Protocol (IP) and load balancer or other means that direct communication requests to designated endpoints in cloud computing platform 1210. The components of cloud computing platform 1210 may communicate with each other over a network (not shown), which may include, without limitation, one or more local area networks (LANs) and/or wide area networks (WANs).

Example Computing Environment

Figure 13:
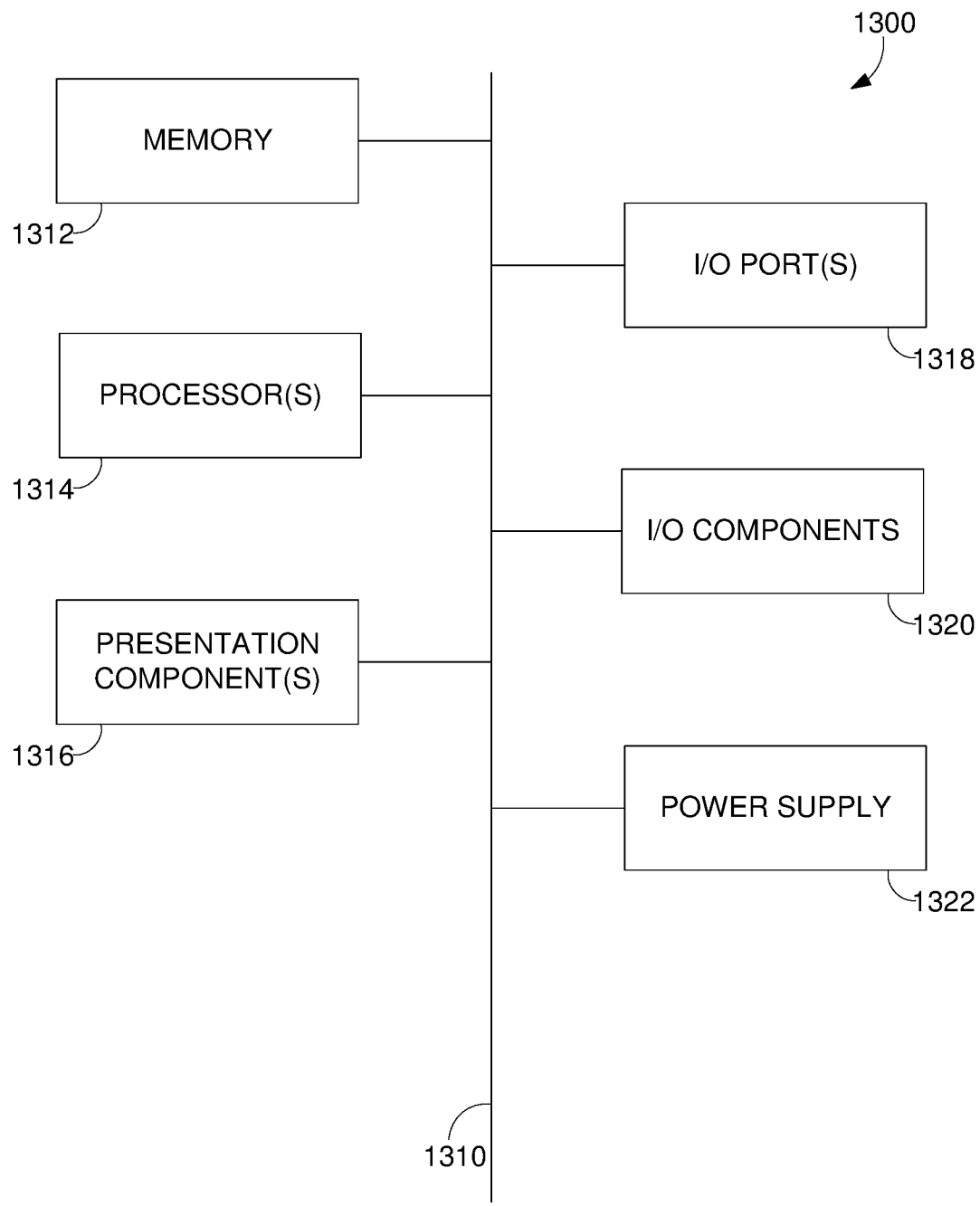
FIG. 13 is a block diagram of an example computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 13 in particular, an exemplary operating environment for implementing embodiments of the present invention is shown and designated generally as computing device 1300. Computing device 1300 is but one example of a suitable computing environment and is not intended to suggest any limitation as to the scope of use or functionality of the invention. Neither should computing device 1300 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 13, computing device 1300 includes bus 1310 that directly or indirectly couples the following devices: memory 1312, one or more processors 1314, one or more presentation components 1316, input/output ports 1318, input/output components 1320, and illustrative power supply 1322. Bus 1310 represents what may be one or more buses (such as an address bus, data bus, or combination thereof). The various blocks of FIG. 13 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 13 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 13 and reference to "computing device."

Computing device 1300 typically includes a variety of computer-readable media. Computer-readable media can be any available media that can be accessed by computing device 1300 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1300. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1312 includes computer storage media in the form of volatile and/or nonvolatile memory. The memory may be removable, non-removable, or a combination thereof. Exemplary hardware devices include solid-state memory, hard drives, optical-disc drives, etc. Computing device 1300 includes one or more processors that read data from various entities such as memory 1312 or I/O components 1320. Presentation component(s) 1316 present data indications to a user or other device. Exemplary presentation components include a display device, speaker, printing component, vibrating component, etc.

I/O ports 1318 allow computing device 1300 to be logically coupled to other devices including I/O components 1320, some of which may be built in. Illustrative components include a microphone, joystick, game pad, satellite dish, scanner, printer, wireless device, etc.

With reference to the hierarchical data integrity verification system, embodiments described herein support autonomous renewal and distribution of secrets. The hierarchical data integrity verification system components refer to integrated components for autonomous renewal and distribution of secrets. The integrated components refer to the hardware architecture and software framework that support functionality within the system. The hardware architecture refers to physical components and interrelationships thereof and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the hierarchical data integrity verification system can include an API library that includes specifications for routines, data structures, object classes, and variables may support the interaction between the hardware architecture of the device and the software framework of the hierarchical data integrity verification system. These APIs include configuration specifications for the hierarchical data integrity verification system such that the different components therein can communicate with each other in the hierarchical data integrity verification system, as described herein. A system, as used herein, refers to any device, process, or service or combination thereof. A system may be implemented using components as hardware, software, firmware, a special-purpose device, or any combination thereof. A system may be integrated into a single device or it may be distributed over multiple devices. The various components of a system may be co-located or distributed. The system may be formed from other systems and components thereof. It should be understood that this and other arrangements described herein are set forth only as examples.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the hierarchical data integrity verification system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for providing hierarchical data integrity verification of erasure coded data, the system comprising:
   one or more computer processors; and
   computer memory storing computer-useable instructions that, when used by the one or more computer processors, cause the one or more computer processors to execute a data manager configured to:
      access data fragments that are erasure coded fragments and a parity fragment generated from the data fragments, wherein the data fragments and the parity fragment correspond to source data;
      generate, based on a non-cryptographic hash function, data-fragment message-digests, data-parity message-digests, or a parity-fragment message-digest,
      wherein, based on a linear property of the non-cryptographic hash function, a data integrity of the source data is verifiable based on the data-fragment message-digests, the data-parity message-digests, or the parity-fragment message-digest and a linear operation;
      cause storing of the data fragments and corresponding data-fragment message-digests or data-parity message digests at two or more corresponding data fragment zones;
      cause storing of a parity fragment and corresponding parity-fragment message-digest at a parity fragment zone;
      execute a local data integrity verification operation for a first data fragment to determine whether a match exists between compared message-digests, wherein the local data integrity verification operation:
         compares a local data-fragment message-digest of the first data fragment to a source data-fragment message-digest of the data fragment in a data fragment zone; or
         compares a local data-parity message-digest of the first data fragment to a source data-parity message-digest of the data fragment in the data fragment zone; or
      execute a global data integrity verification operation for the source data to determine whether a match exists between compared message-digests, wherein the global data integrity verification operation:
         compares a parity-fragment message-digest to a linear operation combination of data-parity message-digests of the source data, wherein the data-parity message-digests are retrieved from the two or more data fragment zones; or
         compares a source-data message-digest to a linear operation combination of data-fragment message-digests of the source data, wherein the data-fragment message-digests are retrieved from the two or more data fragment zones.

2. The system of claim 1, wherein the data manager is further configured to:
   generate, using an erasure coding operation comprising an erasure coding scheme, the data fragments and the parity fragment from a binary large object representation of the source data; and
   initialize generation of message-digests for the data fragments and the parity fragment based on the non-cryptographic function.

3. The system of claim 1, wherein the linear property of the non-cryptographic function is a data-based linear property, wherein the data-based linear property supports verifying the data integrity of the source data based at least in part on an XOR and shift of the data-fragment message-digests.

4. The system of claim 1, wherein the linear property of the non-cryptographic function is a parity-based linear property, wherein the parity-based linear property supports verifying the data integrity of the source data based at least in part on an XOR and shift of the data-parity message-digests.

5. The system of claim 1, wherein the data manager is further configured to verify the data integrity of the source data based on executing the local data integrity verification operations based on the data fragments and the parity fragment and executing the global data integrity verification operation based on the parity fragment and the source data.

6. The system of claim 1, wherein the non-cryptographic hash function is a cyclic redundancy check (CRC) error detecting code.

7. The system of claim 1, wherein the data manager is further configured to execute data processing validation operations based on both the non-cryptographic hash function and a cryptographic hash function executed on both the data fragments and the parity fragment.

8. One or more hardware computer storage media having computer-executable instructions embodied thereon that, when executed, by one or more processors, cause the one or more processors to perform a method for providing hierarchical data integrity verification of erasure coded data, the method comprising:
   accessing data fragments that are erasure coded fragments and a parity fragment generated from the data fragments, wherein the data fragments and the parity fragment correspond to source data;
   generating, based on a non-cryptographic hash function, data-fragment message-digests, data-parity message-digests, or a parity-fragment message-digest,
   wherein, based on a linear property of the non-cryptographic hash function, a data integrity of the source data is verifiable based on the data-fragment message-digests, the data-parity message-digests, or the parity-fragment message-digest and a linear operation;
   causing storing of the data fragments and corresponding data-fragment message-digests or the data-parity message-digests at two or more corresponding data fragment zones; and
   causing storing of the parity fragment and the corresponding parity-fragment message-digest at a parity fragment zone.

9. The media of claim 8, the method further comprising verifying the data integrity of the source data based on executing local data integrity verification operations based on the data fragments and the parity fragment and executing global data integrity verification operation based on the parity fragment and the source data.

10. The media of claim 8, the method further comprising executing a local data integrity verification operation for at least a first data fragment, wherein the local data integrity verification operation compares a local data-fragment message-digest of the first data fragment to a source data-fragment message-digest of the first data fragment in a data fragment zone.

11. The media of claim 8, the method further comprising executing a local data integrity verification operation for at least a first data fragment, wherein the local data integrity verification operation compares a local data-parity message-digest of the first data fragment to a source data-parity message-digest of the first data fragment in a data fragment zone.

12. The media of claim 8, the method further comprising executing a global data integrity verification operation for the parity fragment of the source data, wherein the global data integrity verification operation compares a source parity-fragment message-digest to a linear operation combination of data-parity message-digests of the parity fragment in the parity fragment zone.

13. The media of claim 8, the method further comprising executing a global data integrity verification operation for the source data, wherein the global data integrity verification operation compares a source-data message-digest to a linear operation combination of data-fragment message-digests of the source data.

14. The media of claim 8, wherein the linear property of the non-cryptographic function is a data-based linear property, wherein the data-based linear property supports verifying the data integrity of the source data based at least in part on an XOR of the data-fragment message-digests; and wherein the linear property of the non-cryptographic function is a parity-based linear property, wherein the parity-based linear property supports verifying the data integrity of the source data based at least in part on an XOR of the data-parity message-digests.

15. A method for providing hierarchical data integrity verification of erasure coded data, the method comprising:
accessing a source-data message-digest for a source data;
accessing data-fragment message-digests for the source data, wherein based on a linear property of a non-cryptographic hash function, a data integrity of the source data is verifiable from the data-fragment message-digests, the data-parity message-digests, or a parity-fragment message-digest and a linear operation;
generating a linear operation combination of the data-fragment message-digests retrieved from the two or more data fragment zones; and
executing a global data integrity verification operation for the source data, wherein the global data integrity verification operation compares a source-data message-digest to the linear operation combination of the data-fragment message-digests.

16. The method of claim 15, further comprising accessing a parity-fragment message-digest for a parity fragment of the source data;
accessing data-parity message-digests of the source data;
generate a linear operation combination of the data-parity message-digests retrieved from the two or more data fragment zones;
executing a global data integrity verification operation for the parity fragment, wherein the global data integrity verification operation compares the parity-fragment message-digest to the linear operation combination of the data-parity message-digests.

17. The method of claim 16, further comprising verifying the data integrity of the source data based on executing local data integrity verification operations based on the data-fragment message-digests and the data-parity message-digests and executing the global data integrity verification operation based on the parity fragment and the source data.

18. The method of claim 15, wherein the linear property of the non-cryptographic function is a data-based linear property, wherein the data-based linear property supports verifying the data integrity of the source data based at least in part on the XOR of the data-fragment message-digests.

19. The method of claim 15, wherein the linear property of the non-cryptographic function is a parity-based linear property, wherein the parity-based linear property supports verifying the data integrity of the source data based at least in part on an XOR of the data-parity message-digests.

20. The method of claim 15, wherein the non-cryptographic hash function is a cyclic redundancy check (CRC) error detecting code.

* * * * *